(No Model.) 2 Sheets—Sheet 1.
A. MITSCHERLICH.
PREPARING CELLULOSE FROM WOOD.
No. 284,319. Patented Sept. 4, 1883.
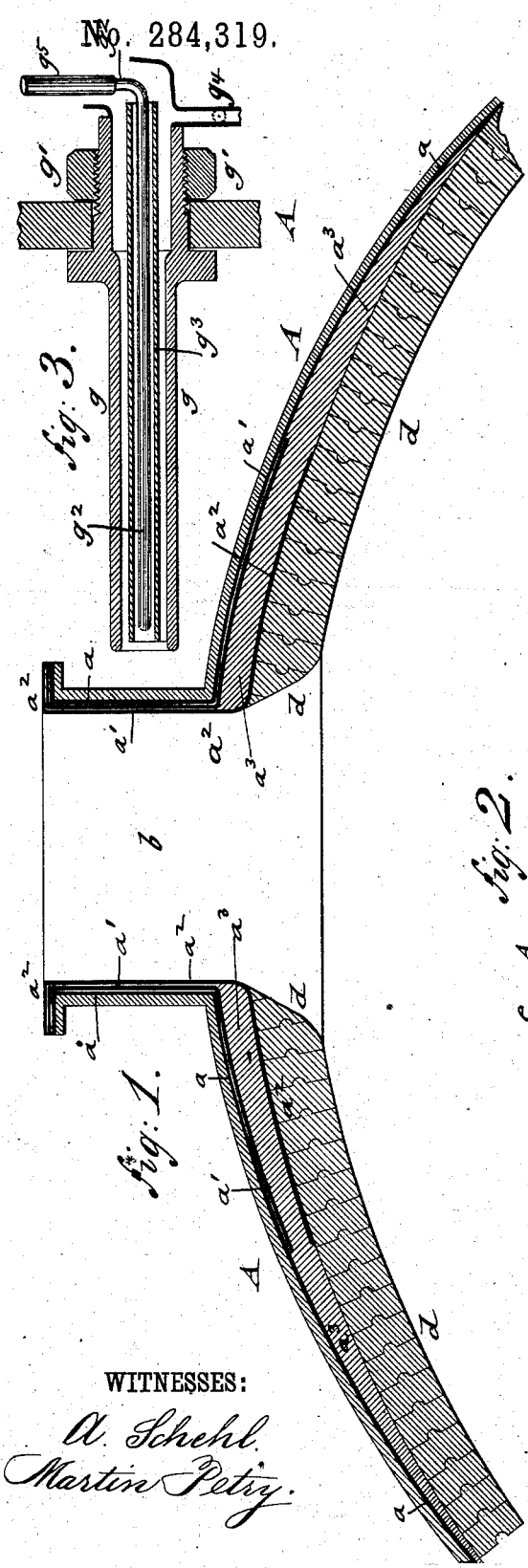
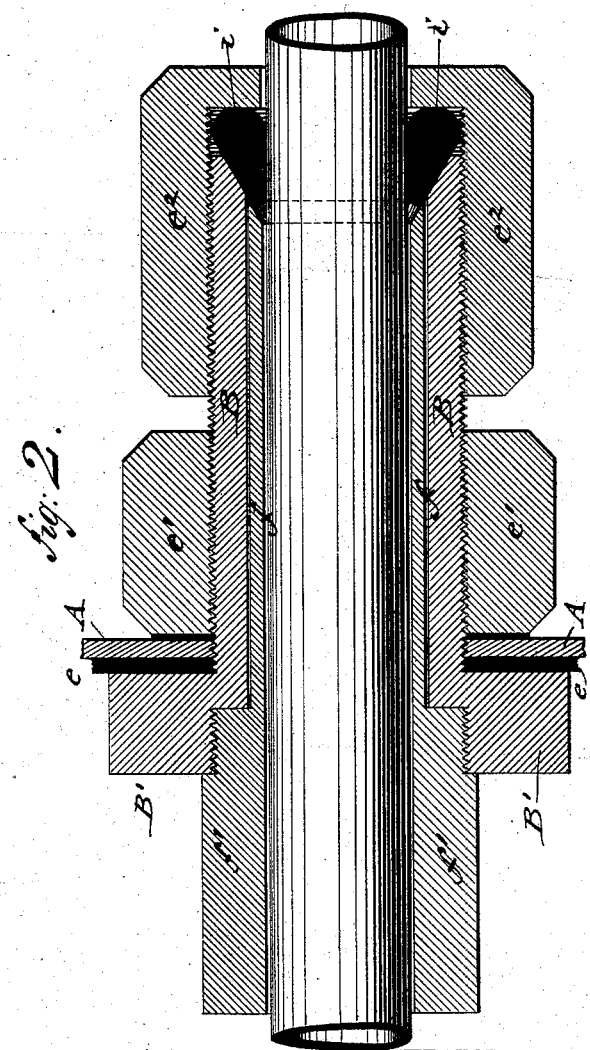
WITNESSES:
A. Schehl.
Martin Petry.
INVENTOR
Alexander Mitscherlich
BY Goepel & Raegener
ATTORNEYS.

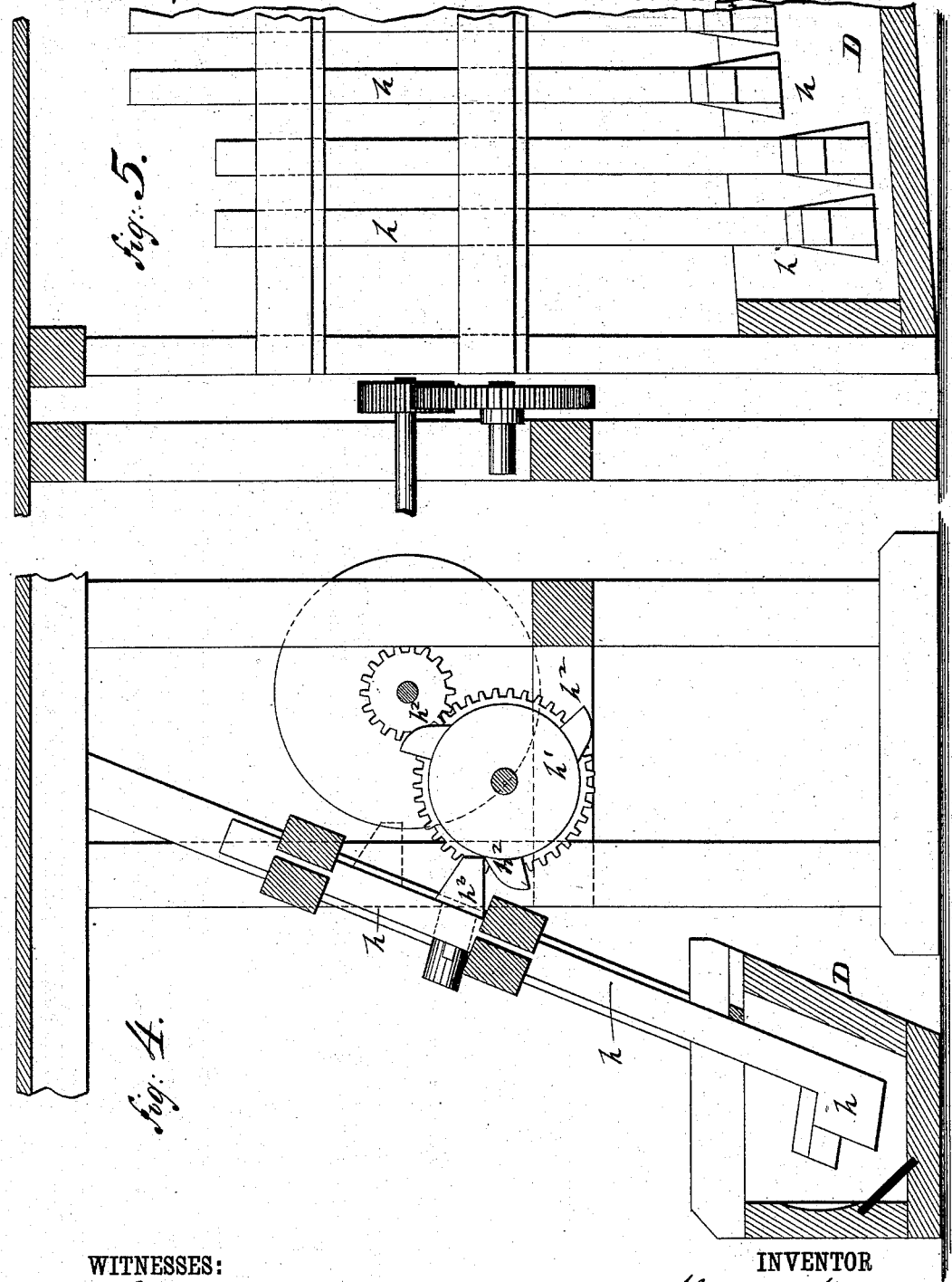

United States Patent Office.

ALEXANDER MITSCHERLICH, OF MÜNDEN, PRUSSIA, GERMANY.

PREPARING CELLULOSE FROM WOOD.

SPECIFICATION forming part of Letters Patent No. 284,319, dated September 4, 1883.

Application filed July 12, 1883. (No model.)

*To all whom it may concern:*

Be it known that I, ALEXANDER MITSCHERLICH, a subject of the Kingdom of Prussia, German Empire, residing at the city of Münden, in the Kingdom of Prussia, German Empire, have invented certain new and useful Improvements in Preparing Cellulose from Wood, of which the following is a specification.

This invention has reference to certain improvements in apparatus for and method of making cellulose, whereby a perfectly white and tough cellulose is obtained at a considerably reduced cost, to be used as a substitute for the best rags in the manufacture of paper.

The invention consists, first, of certain improvements in the apparatus for boiling the wood with the sulphurous-acid solution, and, secondly, of a method of treating the wood stock by first steaming the stock, so as to expel the air from the pores of the same, then boiling it with the sulphurous-acid solution, first at a temperature of about 108° centigrade, which is gradually raised to about 118° centigrade, and finally lowered until the sulphurous acid is entirely driven off.

In the accompanying drawings, Figure 1 represents a vertical central section of a part of a boiler for the wood stock and the sulphurous-acid solution. Fig. 2 is a detail vertical transverse section, showing the connection of the steam-heating pipes with the wall of the boiler. Fig. 3 is a vertical longitudinal section of a device for testing the contents and indicating the temperature; and Figs 4 and 5 are respectively a vertical transverse section of a stamp for beating up the boiled wood stock.

Similar letters of reference indicate corresponding parts.

The wood stock that is employed for making cellulose is boiled in an iron vessel or boiler of cylindrical shape, which is provided with interior protective layers of special construction, by which the corrosive influence of the acid on the iron walls is prevented.

The boiler A is made of considerable size, preferably about twelve feet in diameter and thirty-six feet in length, so that large quantities of wood stock can be treated therein. The interior surface of the boiler A is covered with a thin layer, $a$, of sheet-lead, which is applied at ordinary temperature to the iron walls by a cement composed of common tar and pitch. This cement is heated and the layer of lead placed thereon by rubbing it smoothly and carefully down. By this cement the lead lining adheres in a reliable manner to the walls of the boiler and makes the same thereby entirely acidproof. In case there is a flaw at any part of the iron wall of the boiler A, then the cement, together with the lead lining, protects this part, so that by the increased pressure in the vessel the lead lining only can be injured without the acid attacking the remaining portion of the wall. By properly brazing the weak and leaky part of the boiler-wall the same can be quickly and reliably repaired.

The lead lining should not be too thick, as in that case it cannot be made to adhere properly to the upper part of the boiler-wall, nor can it be properly worked into the different indentations of the sheet-iron. A too thick lead lining would form air-spaces between it and the boiler-wall, which would weaken the lining at that point, and would destroy large portions of the boiler-wall by the action of the acid in case of a leak. The boiler would thereby become unfit for use and some of the iron be dissolved, whereby the contents would be discolored and otherwise injuriously affected.

By carefully cementing the thin lead lining to the inner surface of the boiler the expensive soldering on of the lead lining, which had heretofore to be resorted to, is done away with, and thereby a more efficient boiler-lining obtained, by which the security and durability of the boiler is considerably increased.

The man-holes $b$ of the boiler, which serve for the introduction of the wood stock as well as for the removal of the product obtained therefrom, are closed by suitable lids and are covered, besides the interior layer, $a$, with a second layer, $a'$, of sheet-lead, which is cemented in the same manner over the man-hole and extended to some distance from the man-hole over the interior surface of the boiler. A third layer, $a^2$, of sheet-lead is next applied over the second layer, $a'$, and extended from the man-hole and over the adjoining part of the boiler, a thick layer, $a^3$, of cement being interposed between the same and the second layer, $a'$. These different layers of lead are required at the man-hole, as the lead lining $a$ at that point is not protected by the glazed porcelain bricks $d$, which cover the entire interior surface of the boiler, as shown in Fig. 1. As soon as the innermost covering, $a^2$, shows signs of wear the same is renewed, and thereby the interior surface of the man-hole fully protected.

The contents of the boiler are heated up by coils of lead pipes, which extend from the bottom to about half the height of the boiler. Several parallel systems of lead coils are preferably used, so that in case of leakage one or the other coil can be shut off and the boiling operation continued with the remaining coils. For the heating-pipes an alloy of lead and antimony is used, as this resists in a higher degree than pure lead the action of the mechanical and chemical agencies to which the same is exposed. The lead coils are connected with the steam-boiler at one end, and at the other end with condensing-chambers, through which at high pressure the water of condensation is forced out. These features are not shown in the drawings, as I do not claim the same, but I mention them, as thereby temperatures considerably above 100° centigrade can be readily obtained.

The lead pipes are connected to the boiler-wall by the coupling shown in detail in Fig. 2. A cast-iron sleeve, B, that is flanged at one end and threaded at its exterior surface, is inserted through an opening in the boiler-wall to the interior of the boiler, until the interior flange, B', abuts against the wall of the boiler, between which and the flange a lead lining, $e$, is interposed. A screw-nut, $e'$, is screwed over the outer threaded shank of the sleeve B tightly against the boiler-wall. A second flanged nut, $e^2$, is screwed over the end of the outer sleeve, B, its flange pressing tightly on a lead or asbestus ring, $i$, and forcing it against the beveled end of the sleeve B, as shown clearly in Fig. 2. The sleeve B is covered at its inside by a lead lining, $f$, that is screwed by its threaded thicker end $f'$ to the flange B'. By this construction a very reliable steam-tight coupling of the heating pipe and boiler is obtained, which is capable of resisting the acid in the boiler. The boiler is next provided with a device for testing the contents of the same, and for readily observing the temperature and pressure in the same. These objects are combined in one attachment, (shown in Fig. 3,) so that only one opening has to be made through the boiler-wall. The device consists of a fixed tubular socket, $g$, which is firmly secured by a threaded portion and exterior screw-nut, $g'$, to the boiler-wall. A thermometer-tube, $g^2$, passes centrally through the socket-tube $g$, and is protected by a metal sleeve, $g^3$, between which latter and the tubular socket $f$ sufficient space is left for drawing off a small portion of the contents of the boiler through a suitable valve, $g^4$. A thermometer, $g^5$, is applied to the upwardly-bent outer end of the pipe $g^2$. Besides the thermometer $g^5$ and test-valve $g^4$, a pressure-gage may be arranged, and also a gage for indicating the level of the solution in the boiler. After the wood stock has been treated for the proper length of time in the boiler the stock is removed and passed through a stamp-battery, which has the object to separate the fibers of the cellulose from each other, as well as to wash out the substances incrusting the same. This separating and washing apparatus is shown in Figs. 4 and 5, and consists of a number of inclined stamps, $h$, that are successively actuated by the cams $h^2$ of the revolving cylinder $a'$, which cams engage projections $h^3$ on the shanks of the stamps. The stamps $g\ g$ move up and down in a trough, D, having a longitudinally-inclined bottom, so as not to separate the fibers of the wood stock from each other by repeated blows thereon, but also to separate the softer parts of the same from the harder parts of the same—such as knots—which latter would otherwise be broken up by the stamps, and would deteriorate the pulp. To prevent the breaking of the knots the stamps $g$ do never touch the bottom of the trough, and are also guided at some distance from the inclined side walls of the same, as shown clearly in Fig. 4. By this arrangement the stamps exert a pressing and rubbing action on the mass without breaking up the knots. The boiled wood stock is introduced to the trough at the lower point, and the water at the highest point of the same, so that they pass in counter-directions to each other in the trough. The stamps are dropped alternately in such a manner that the mass is moved in upward direction over the inclined body of the trough. In this manner the proper separating and washing of the fibers is obtained without injury to the same, as with each blow of the stamp the water is pressed out of the fibers directly affected by the blow, which quickly again absorb the moisture, and so on throughout the stamping operation. After the stock is thus properly broken up and washed it is bleached and treated in the usual manner, so as to bring it into proper marketable form.

I reserve the right to file a separate application for the improved washing and stamping apparatus shown in Figs. 4 and 5.

To boil the wood stock the following process is employed: The wood is cleared of bark, cut into small pieces, and charged in a proper quantity into the boiler. It is then steamed in the boiler, which steaming, however, has to be carefully watched, as on the same depends, in a high degree, the success of the subsequent boiling. The object of the steaming is not to prepare the stock for the chemical action of the acid solution, but to drive out the atmospheric air from the pores of the wood, and give easy access of the solution into the cells of the wood. In this manner not only a more rapid chemical action upon the wood stock takes place, but also, owing to the increased absorption of the solution into the stock, a larger quantity of wood can be charged to and treated in the boiler, as the space in the same is more advantageously utilized, and thereby the output of the boiler is considerably increased. The steaming is continued to a greater or less length of time, according to the condition of the wood. If the same is freshly cut and moist, the atmospheric air is expelled therefrom in a comparatively short time; but if the same is dry and hard a longer exposure of the same to the steam is necessary. The expulsion of the air is further accelerated by the cold acid solution when admitted into the boiler, and causes the quick condensation of the steam and reduces thereby the pressure in the boiler. Care has to be taken that the temperature during the steaming process does not rise above 100° centigrade, as practical tests have proved that at a higher temperature the steaming of the wood does not take place in so perfect a manner. This steaming of the wood stock at this stage is entirely different from steaming of the wood before the same is ground up, as in the latter case a chemical change is effected and a brownish color imparted to the stock. After the wood has been properly steamed the boiler is supplied with the sulphurous-acid solution. The quantity of organic substances to be worked up has to be in proportion to the degree of concentration of the sulphurous-acid solution, which varies and is dependent upon certain conditions connected with the preparation of the same. If the proper proportion between the organic substances and the sulphurous-acid solution is not established, and, for instance, an insufficient quantity of organic substances be present, then insoluble salts are deposited in the fibers, which can be washed out only with difficulty. For instance, when bisulphite of lime is used in the solution sulphite of lime may be formed, which is only soluble with difficulty. If such fiber be used for paper, it would produce so-called "knots" in the paper. Furthermore, in bleaching such fibers with chloride of lime much larger quantities of the same would be required, so that the expense of the bleaching process is considerably increased. If, however, a too great quantity of organic substances is present in the acid solution, the product does not become sufficiently soft or "opened." The proper proportions have to be determined by a series of tests, which are made by drawing off from time to time small quantities of the contents through the testing-tube heretofore described.

During the boiling process it is necessary to carefully observe the temperature as well as the duration of the boiling. The first stage consists in the slow and gradual chemical action of the solution on the wood, so that that part which has been absorbed by the stock can be replaced. This takes place best at a temperature not exceeding 108° centigrade. After this a quick reaction at a temperature which is gradually increased to about 118° centigrade has to be produced. Special care has to be taken toward the end of the reaction, as this has to go hand in hand with the driving off of the sulphurous acid. By the driving off of the sulphurous-acid solution the chemical action is gradually retarded in the same manner as by lowering of the temperature. By properly observing the different stages of the process by taking small test quantities from time to time from the boiler and mixing them with suitable reagents, the quantity of active solution still present can be readily determined. If, for instance, bisulphite of lime is used and the testing-solution is mixed with ammonia and the precipitate carefully observed, by the ammonia or similar chemical substances a part of the sulphurous acid is retained in solution, while the sulphite of lime in the acid solution is precipitated. The salts which are formed in the due course of the process are not precipitated. From the precipitate the proportion of the effective solution can be readily determined. When the precipitate is only equal to one-sixteenth of the volume of testing-solution the proper time has arrived when the driving off of the sulphurous-acid solution has to be commenced. As the solution passes off with the steam forced in the boiler, the temperature is lowered to about 106° centigrade, whereby also a decrease of pressure is obtained. If the precipitate in the testing-tube is only one thirty-second part of the testing-solution, the process is fully completed and the solution has to be quickly drawn off. A still smaller precipitate will prove that the process has gone too far, and that no further organic substances are present, in which case free acid, probably sulphuric acid, would be formed that would impart an injurious brownish color on the organic mass.

To carry on this process with such a certainty through the different stages and temperatures described, which are of considerable importance, a boiler of large dimensions, with the different accessories described, is of special advantage, though by a higher temperature the boiling process may be accelerated. There would also be a higher pressure required, and the cellulose obtained thereby would not only be inferior in quality, but also in toughness and quantity.

The chemical process which takes place during the boiling process before described can be explained as follows:

The sulphurous acid is oxidized by combining with a part of the oxygen of the cellulose and of the organic substances, and formed into sulphuric acid, that under normal circumstances combines with the bases that have before been united with the sulphurous acid. When the process is not properly conducted, free acid would be formed in the solution, which would exert an injurious influence upon the fibers. Besides the free acid and its combination, the incrusted substances are formed into compound combinations of tannic acid and its by-products, which are highly objectionable. For the proper carrying out of the boiling process it is an essential condition that the sulphurous-acid solution be free of polythionic salts, as by the same a brownish-black deposit is formed during the boiling process on the wood stock, so that the same remains hard and causes a failure of the boiling operation. At the same time a considerable increase of temperature takes place, so that the tests taken from the boiler show an abnormally-quick decrease in the proportion of sulphurous acid in the solution. These polythionic acids are generated commonly by the presence of free sulphur-fumes during the roasting process. To prevent their presence care has to be taken that sulphurous acid free of such acid and salt is obtained and used.

Having thus described my invention, I claim as new and desire to secure by Letters Patent—

1. An iron boiler for cooking wood stock for cellulose, the interior surface of which is covered with a lining of thin sheet-lead that is applied by a cement of tar and pitch and covered with a lining of glazed bricks, substantially as set forth.

2. The combination of a boiler for wood stock and the heating-coils of lead pipes, with a coupling for the lead pipe, consisting of a threaded and flanged sleeve having an interior lead lining, an exterior fastening screw-nut, and a ring-shaped packing and retaining-nut, substantially as set forth.

3. The combination, with a boiler for wood stock, of tubular socket, an interior tube for protecting the thermometer-tube, and a valve for drawing off the test-solutions, substantially as set forth.

4. The process herein described of treating wood stock for cellulose, which consists, first, in steaming the organic substances, so as to drive off the atmospheric air contained in the cells of the wood; second, boiling the stock with a sulphurous-acid solution at a temperature of 108° centigrade; thirdly, raising the temperature of the solution to 118° centigrade, and finally lowering it again, when the boiling process is completed, substantially as and for the purpose set forth.

In testimony whereof I have signed my name to this specification in the presence of two subscribing witnesses.

ALEXANDER MITSCHERLICH.

Witnesses:
B. ROI,
GERARD W. VON NAWROCKI.